(12) United States Patent
Cruttenden et al.

(10) Patent No.: US 12,086,883 B2
(45) Date of Patent: *Sep. 10, 2024

(54) POINT OF SALE COMPUTER-IMPLEMENTED INVESTMENT MANAGEMENT TECHNOLOGY

(71) Applicant: Acorns Grow Incorporated, Irvine, CA (US)

(72) Inventors: Jeffrey Cruttenden, Newport Beach, CA (US); Walter Cruttenden, Corona del Mar, CA (US); Jason Martell, Irvine, CA (US)

(73) Assignee: Acorns Grow Incorporated, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,800

(22) Filed: Apr. 25, 2022

(65) Prior Publication Data

US 2023/0048957 A1    Feb. 16, 2023

Related U.S. Application Data

(63) Continuation of application No. 16/677,560, filed on Nov. 7, 2019, now Pat. No. 11,348,179, which is a
(Continued)

(51) Int. Cl.
G06Q 40/06    (2012.01)
G06Q 20/20    (2012.01)

(52) U.S. Cl.
CPC ............ *G06Q 40/06* (2013.01); *G06Q 20/20* (2013.01)

(58) Field of Classification Search
CPC .............................. G06Q 40/06; G06Q 20/20
See application file for complete search history.

(56) References Cited

U.S. PATENT DOCUMENTS

| 3,573,747 A | 4/1971 | Adams et al. |
| 4,108,361 A | 8/1978 | Krause |

(Continued)

FOREIGN PATENT DOCUMENTS

| JP | 2002507015 | 3/1999 |
| JP | 2002507015 A | * 3/2002 |

(Continued)

OTHER PUBLICATIONS

Acorns Is A Micro-Investment App That Does All The Thinking For You [online]. Techcrunch, Aug. 26, 2014. [retrieved on Mar. 15, 2016]. pp. 1-6. Retrieved from the Internet. http://techcrunch.com/2014/08/26/acorns-is-a-microinvestment-app-that-does-all-thethinkinQ-for-vou.

(Continued)

*Primary Examiner* — Ashford S Hayles
(74) *Attorney, Agent, or Firm* — Knobbe, Martens, Olson & Bear, LLP

(57) ABSTRACT

A computer-implemented communications device in communication with a transaction gateway server during a point of sale transaction. A computation server configured for intercepting a first transaction instantiated by the communications device, the first transaction having a first numerical value; the computation server instead of processing the first transaction processing: a second transaction having a second numerical value greater than the first numerical value, and a third transaction having a third numerical value determined based on a numerical difference between the first numerical value and the second numerical value.

18 Claims, 7 Drawing Sheets

Related U.S. Application Data continuation of application No. 15/676,423, filed on Aug. 14, 2017, now Pat. No. 10,521,862, which is a continuation of application No. 14/329,509, filed on Jul. 11, 2014, now Pat. No. 9,734,536, which is a continuation of application No. 13/366,499, filed on Feb. 6, 2012, now Pat. No. 8,781,906.

(56) References Cited

U.S. PATENT DOCUMENTS

| | | | |
|---|---|---|---|
| 4,750,119 A | 6/1988 | Cohen et al. | |
| 4,751,640 A | 6/1988 | Lucas et al. | |
| 4,882,473 A | 11/1989 | Bergeron et al. | |
| 5,202,826 A | 4/1993 | McCarthy | |
| 5,205,826 A | 4/1993 | Chen et al. | |
| 5,297,026 A | 3/1994 | Hoffman | |
| 5,483,444 A | 1/1996 | Heintzeman et al. | |
| 5,513,102 A | 4/1996 | Auriemma | |
| 5,537,314 A | 7/1996 | Kanter | |
| 5,621,640 A | 4/1997 | Burke | |
| 5,689,100 A | 11/1997 | Carrithers et al. | |
| 5,734,838 A | 3/1998 | Robinson et al. | |
| 5,774,870 A | 6/1998 | Storey | |
| 5,787,404 A | 7/1998 | Fernandez-Holman | |
| 5,890,963 A | 4/1999 | Yen | |
| 5,970,480 A | 10/1999 | Kalina | |
| 5,991,736 A | 11/1999 | Ferguson et al. | |
| 6,070,153 A * | 5/2000 | Simpson | G06Q 40/06 705/40 |
| 6,076,166 A | 6/2000 | Moshfeghi et al. | |
| 6,088,682 A * | 7/2000 | Burke | G06Q 20/209 705/17 |
| 6,105,865 A | 8/2000 | Hardesty | |
| 6,112,191 A * | 8/2000 | Burke | G06Q 20/18 705/17 |
| 6,164,533 A * | 12/2000 | Barton | G06Q 30/02 235/462.43 |
| 6,598,028 B1 * | 7/2003 | Sullivan | G06Q 40/02 705/37 |
| 6,876,971 B1 * | 4/2005 | Burke | G06Q 20/04 705/14.1 |
| 6,876,978 B1 | 4/2005 | Walker et al. | |
| 6,912,509 B1 | 6/2005 | Lear | |
| 6,941,279 B1 * | 9/2005 | Sullivan | G06Q 30/02 705/37 |
| 7,028,827 B1 | 4/2006 | Molbak et al. | |
| 7,264,153 B1 | 9/2007 | Burke | |
| 7,502,758 B2 | 3/2009 | Burke | |
| 7,571,849 B2 | 8/2009 | Burke | |
| 7,574,403 B2 * | 8/2009 | Webb | G06Q 30/02 705/40 |
| 7,577,604 B2 | 8/2009 | Ogilvie | |
| 7,765,147 B2 | 7/2010 | Khoury | |
| 7,831,494 B2 * | 11/2010 | Sloan | G06Q 40/08 705/37 |
| 7,991,677 B2 | 8/2011 | Haggerty | |
| 8,025,217 B2 | 9/2011 | Burke | |
| 8,195,576 B1 | 6/2012 | Grigg et al. | |
| 8,234,188 B1 | 7/2012 | Phillips et al. | |
| 8,255,329 B1 * | 8/2012 | Barth | G06Q 20/227 705/43 |
| 8,301,530 B2 * | 10/2012 | Carretta | G06Q 40/03 705/38 |
| 8,370,243 B1 * | 2/2013 | Cernyar | G06Q 40/06 705/36 R |
| 8,416,924 B1 * | 4/2013 | Barth | G06Q 40/02 705/14.1 |
| 8,458,026 B2 | 6/2013 | Voltmer et al. | |
| 8,464,935 B2 | 6/2013 | Hansen et al. | |
| 8,583,515 B2 | 11/2013 | Sorbe et al. | |
| 8,626,579 B2 | 1/2014 | Fordyce | |
| 8,732,089 B1 | 5/2014 | Fang et al. | |
| 8,781,906 B2 | 7/2014 | Cruttenden et al. | |
| 8,791,949 B1 * | 7/2014 | Mackrell | G06Q 40/06 345/440.1 |
| 8,799,153 B2 | 8/2014 | White et al. | |
| 9,244,601 B2 | 1/2016 | Kim et al. | |
| 9,734,536 B2 | 8/2017 | Cruttenden et al. | |
| 9,747,597 B2 | 8/2017 | Wu | |
| 9,794,797 B2 | 10/2017 | Hoffberg et al. | |
| 9,830,648 B2 | 11/2017 | Kanjila et al. | |
| 9,836,736 B1 | 12/2017 | Neale et al. | |
| 9,842,321 B2 | 12/2017 | Johnston et al. | |
| 9,953,373 B2 | 4/2018 | Winters | |
| 9,990,642 B2 | 6/2018 | Strock et al. | |
| 10,097,663 B1 | 10/2018 | Ferenczi et al. | |
| 10,157,420 B2 | 12/2018 | Narayana et al. | |
| 10,410,243 B2 | 9/2019 | Boal | |
| 10,521,862 B2 | 12/2019 | Cruttenden et al. | |
| 10,872,341 B1 | 12/2020 | Beckman et al. | |
| 10,937,097 B1 | 3/2021 | Cruttenden et al. | |
| 10,943,242 B2 | 3/2021 | Kinkead et al. | |
| 11,107,332 B1 | 8/2021 | Velline et al. | |
| 11,176,614 B1 | 11/2021 | Cruttenden et al. | |
| 11,348,179 B2 * | 5/2022 | Cruttenden | G06Q 20/20 |
| 2002/0023026 A1 * | 2/2002 | Carroll | G06Q 40/02 705/14.18 |
| 2002/0042742 A1 | 4/2002 | Glover et al. | |
| 2002/0046124 A1 | 4/2002 | Alderucci et al. | |
| 2002/0052818 A1 | 5/2002 | Loveland | |
| 2002/0062272 A1 | 5/2002 | Kim et al. | |
| 2002/0123954 A1 * | 9/2002 | Hito | G06Q 40/04 705/36 R |
| 2002/0138383 A1 * | 9/2002 | Rhee | G06Q 40/04 705/36 R |
| 2002/0156722 A1 | 10/2002 | Greenwood | |
| 2002/0198799 A1 | 12/2002 | Burden | |
| 2003/0050889 A1 | 3/2003 | Burke | |
| 2003/0074311 A1 | 4/2003 | Saylors et al. | |
| 2003/0083930 A1 | 5/2003 | Burke | |
| 2003/0093353 A1 * | 5/2003 | Ward | G06Q 40/02 705/36 R |
| 2003/0125108 A1 | 7/2003 | Groz | |
| 2003/0149629 A1 * | 8/2003 | Claridge | G06Q 20/1085 705/17 |
| 2003/0163404 A1 | 8/2003 | Hu et al. | |
| 2003/0191711 A1 | 10/2003 | Jamison et al. | |
| 2003/0200163 A1 | 10/2003 | O'Riordan et al. | |
| 2003/0225649 A1 * | 12/2003 | Simpson | G06Q 40/02 705/35 |
| 2004/0222285 A1 * | 11/2004 | Pohl | G06Q 20/04 235/379 |
| 2004/0243498 A1 * | 12/2004 | Duke | G06Q 99/00 705/35 |
| 2005/0044038 A1 | 2/2005 | Whiting et al. | |
| 2005/0240521 A1 | 10/2005 | Fuentes-Torres | |
| 2006/0036523 A1 * | 2/2006 | Stover | G06Q 40/06 705/35 |
| 2006/0047589 A1 * | 3/2006 | Grau | G06Q 40/06 705/35 |
| 2007/0011089 A1 * | 1/2007 | DeSchryver | G06Q 20/04 705/35 |
| 2007/0033134 A1 | 2/2007 | Carettea et al. | |
| 2007/0034688 A1 | 2/2007 | Burke | |
| 2007/0043666 A1 | 2/2007 | Burdette | |
| 2007/0061252 A1 | 3/2007 | Burke | |
| 2007/0094130 A1 * | 4/2007 | Burke | G06Q 20/10 705/39 |
| 2007/0157105 A1 | 7/2007 | Owens et al. | |
| 2007/0167219 A1 | 7/2007 | Groz | |
| 2007/0185810 A1 * | 8/2007 | Kalra | G06Q 20/102 705/40 |
| 2007/0294158 A1 | 12/2007 | Patel et al. | |
| 2008/0010201 A1 * | 1/2008 | Pratt | G06Q 20/10 705/41 |
| 2008/0065532 A1 * | 3/2008 | De La Motte | G06Q 20/10 705/39 |
| 2008/0162377 A1 * | 7/2008 | Pinkas | G06Q 40/04 705/36 R |
| 2008/0249957 A1 * | 10/2008 | Masuyama | G06Q 40/06 705/36 R |

(56) References Cited

U.S. PATENT DOCUMENTS

| | | | |
|---|---|---|---|
| 2008/0255951 A1* | 10/2008 | Miller | G06Q 40/00 705/14.27 |
| 2008/0288398 A1 | 11/2008 | Maricondi | |
| 2009/0063332 A1* | 3/2009 | Tabaczynski | G06Q 30/02 705/39 |
| 2009/0089104 A1* | 4/2009 | Kondaks | G06Q 40/00 705/16 |
| 2009/0106161 A1 | 4/2009 | Alemany | |
| 2009/0150284 A1 | 6/2009 | Burke | |
| 2009/0150286 A1* | 6/2009 | Barton | G06Q 20/40145 705/44 |
| 2009/0177564 A1 | 7/2009 | Burke | |
| 2009/0181777 A1 | 7/2009 | Christiani et al. | |
| 2009/0198625 A1 | 8/2009 | Walker et al. | |
| 2009/0204503 A1* | 8/2009 | Hursta | G06Q 40/06 705/16 |
| 2009/0204528 A1* | 8/2009 | Moses | G06Q 40/00 705/35 |
| 2009/0215537 A1 | 8/2009 | Poff | |
| 2009/0318220 A1 | 12/2009 | Arezina et al. | |
| 2010/0005034 A1* | 1/2010 | Carpenter | G06Q 40/06 705/36 R |
| 2010/0005035 A1* | 1/2010 | Carpenter | G06Q 40/00 705/37 |
| 2010/0121723 A1* | 5/2010 | Miller | G06Q 40/02 705/16 |
| 2010/0124986 A1 | 5/2010 | Van Luchene | |
| 2010/0250436 A1 | 9/2010 | Loevenguth et al. | |
| 2011/0004514 A1 | 1/2011 | Thomas | |
| 2011/0125637 A1* | 5/2011 | Kalra | G06Q 40/02 705/40 |
| 2011/0137913 A1* | 6/2011 | Bhatti | G06Q 10/10 707/741 |
| 2011/0307318 A1* | 12/2011 | LaPorte | G06Q 20/387 705/14.27 |
| 2012/0116992 A1* | 5/2012 | Tuchman | G06Q 30/0241 705/36 R |
| 2012/0123849 A1* | 5/2012 | Armstrong | G06Q 40/04 705/14.33 |
| 2012/0173454 A1* | 7/2012 | Shah | G06Q 40/06 705/36 R |
| 2012/0231878 A1 | 9/2012 | Angelo | |
| 2012/0233089 A1* | 9/2012 | Calman | G06Q 40/00 705/36 R |
| 2012/0233090 A1* | 9/2012 | Tavares | G06Q 40/06 705/36 R |
| 2012/0259762 A1* | 10/2012 | Tarighat | G06F 8/34 705/37 |
| 2013/0013530 A1 | 1/2013 | Nowacki | |
| 2013/0111600 A1 | 5/2013 | Guenther | |
| 2013/0138577 A1* | 5/2013 | Sisk | G06Q 40/04 705/36 R |
| 2013/0166476 A1* | 6/2013 | Samson | G06Q 40/06 705/36 R |
| 2013/0187780 A1 | 7/2013 | Angelides | |
| 2013/0198108 A1* | 8/2013 | Walia | G06Q 40/06 705/36 R |
| 2013/0204726 A1* | 8/2013 | Cruttenden | G06Q 20/20 705/21 |
| 2013/0332388 A1 | 12/2013 | Martell et al. | |
| 2014/0040121 A1 | 2/2014 | Robb et al. | |
| 2014/0052594 A1 | 2/2014 | Zimmer et al. | |
| 2014/0098030 A1 | 4/2014 | Tang | |
| 2014/0180790 A1 | 6/2014 | Boal | |
| 2014/0180793 A1 | 6/2014 | Boal | |
| 2014/0180806 A1 | 6/2014 | Boal | |
| 2014/0180826 A1 | 6/2014 | Boal | |
| 2014/0189608 A1 | 7/2014 | Shuttleworth et al. | |
| 2014/0223347 A1 | 8/2014 | Seo et al. | |
| 2014/0279185 A1 | 9/2014 | Merz et al. | |
| 2014/0281946 A1 | 9/2014 | Avni et al. | |
| 2015/0081458 A1 | 3/2015 | Cruttenden et al. | |
| 2015/0120425 A1 | 4/2015 | Caldwell | |
| 2015/0339280 A1 | 11/2015 | McLaughlin et al. | |
| 2016/0012392 A1 | 1/2016 | Paden et al. | |
| 2016/0259413 A1 | 9/2016 | Anzures et al. | |
| 2016/0266724 A1 | 9/2016 | Plumb-Larrick et al. | |
| 2016/0321214 A1 | 11/2016 | Hickey | |
| 2016/0335479 A1 | 11/2016 | Barlett, II et al. | |
| 2016/0335653 A1 | 11/2016 | Bodington | |
| 2017/0272249 A1 | 9/2017 | Bhandarkar et al. | |
| 2017/0345098 A1 | 11/2017 | Cruttenden et al. | |
| 2018/0227370 A1 | 8/2018 | Robles et al. | |
| 2018/0341933 A1 | 11/2018 | Renke et al. | |
| 2018/0364665 A1 | 12/2018 | Clymer et al. | |
| 2019/0095064 A1 | 3/2019 | Alexander | |
| 2019/0146639 A1 | 5/2019 | Sarode et al. | |
| 2019/0237189 A1 | 8/2019 | Geller et al. | |
| 2020/0074555 A1 | 3/2020 | Cruttenden et al. | |
| 2020/0077483 A1 | 3/2020 | Agarwal et al. | |
| 2020/0159871 A1 | 5/2020 | Bowen et al. | |
| 2020/0258176 A1 | 8/2020 | Gibson | |
| 2020/0304626 A1 | 9/2020 | Phillips et al. | |
| 2020/0393952 A1 | 12/2020 | Hsiao | |
| 2021/0174451 A1 | 6/2021 | Cruttenden et al. | |

FOREIGN PATENT DOCUMENTS

| | | |
|---|---|---|
| WO | WO 96/34358 | 10/1996 |
| WO | WO 2011/103520 | 8/2011 |

OTHER PUBLICATIONS

Acorns—Invest, Earn, Grow, Spend, Later, acorns.com [online], available by Sep. 4, 2014 as verified by Wayback Machine®, [retrieved on Feb. 10, 2021], retrieved from the Internet <URL: https://web.archive.org/web/20140904101831 /https://www.acorns.com/ > (Year: 2014). 5 pages.

Acorns App Makes You a Better Saver, by Bozzo, smartphone.gadgethacks.com [online], published on Oct. 14, 2014, [retrieved on Feb. 11, 2021], retrieved from the Internet <URL: https://smartphones.gadgethacks.com/how-to/acorns-app-makes-you-better-saver-withoutyou-even-noticing-0157807/> (Year: 2014). 1 page.

Acorns Review [online]. 148Apps, Oct. 6, 2014 [retrieved on Mar. 15, 2016]. pp. 1-18. Retrieved from the Internet. < http://www.148apps.com/reviews/acorns-review-3/>.

Acorns App Wants To Invest Your Spare Change [online]. Direkt Concept. pp. 1-2. Jun. 18, 2014. [retrieved on Mar. 15, 2016]. Retrieved from the Internet. < http:/ /www. di rektconcept. com/ 2014/06/18/acorns-app-wants-to-invest-soare-change/>.

"Aggregate Transaction Data." Plaid, (Sep. 22, 2015). https://plaid.com/solutions/transaction-data/. Web. Accessed on Apr. 20, 2017. 5 pages.

Newsweek: Cover story: 'Technology: What You'll Want Next'. (May 23, 1993). PR Newswire. 15 pages. Retrieved from http://search.proquest.com/docview/449709031?accountid=14753. Retrieved on Mar. 29, 2016.

The Complete Guide to Account Aggregation. BlueLeaf, (Jul. 24, 2014). https://www.blueleaf.com/what-is-account-aggregation/. Web. Accessed on Apr. 20, 2017. 1 0 pages.

Remote Control Relay, apkpure.com [online], published on Jan. 20, 2016, [retrieved on Oct. 21, 2020], retrieved from the Internet <URL: https://apkpure.com/remote-control-relay/com.androidream.remotecontrolrelay> (Year: 2016). 2 pages.

"Robinhood.com" Robinhood.com, 2014. Web Aug. 23, 2016. 11 pages.; <<https://www.robinhood.com/>>.

Symons, A. (1998). "Making the connection through technology." Drug Store News, 20(20), 57-57, 107+. 4 pages. Retrieved from http://search.proquest.com/docview/204 728199?accountid=14 753. Retrieved on Mar. 29, 2016.

Specification filed Mar. 20, 2000 in U.S. Appl. No. 09/531,412, related application data for now U.S. Pat. No. 7,574,403 (Year: 2000). 69 pages.

Duncan, Shelli. "Planting Acorns: When It Comes to Investing, Small Steps Can Yield Big Rewards." Modern Hygienist 3.9 (2007): 44-. Print. (Year: 2007) 5 pages.

(56) References Cited

OTHER PUBLICATIONS

Golio, Mike. "Live Below Your Means (LBYM)," in Engineering Your Retirement: Retirement Planning for Technology Professionals, IEEE, 2006, pp. 45-69, doi:10.1002/9780470112472.ch3. (Year: 2006).

Golio, Mike. "Your Investment Plan," in Engineering Your Retirement: Retirement Planning for Technology Professionals, IEEE, 2006, pp. 115-148, doi: 10.1002/9780470112472.ch6. (Year: 2006).

\* cited by examiner

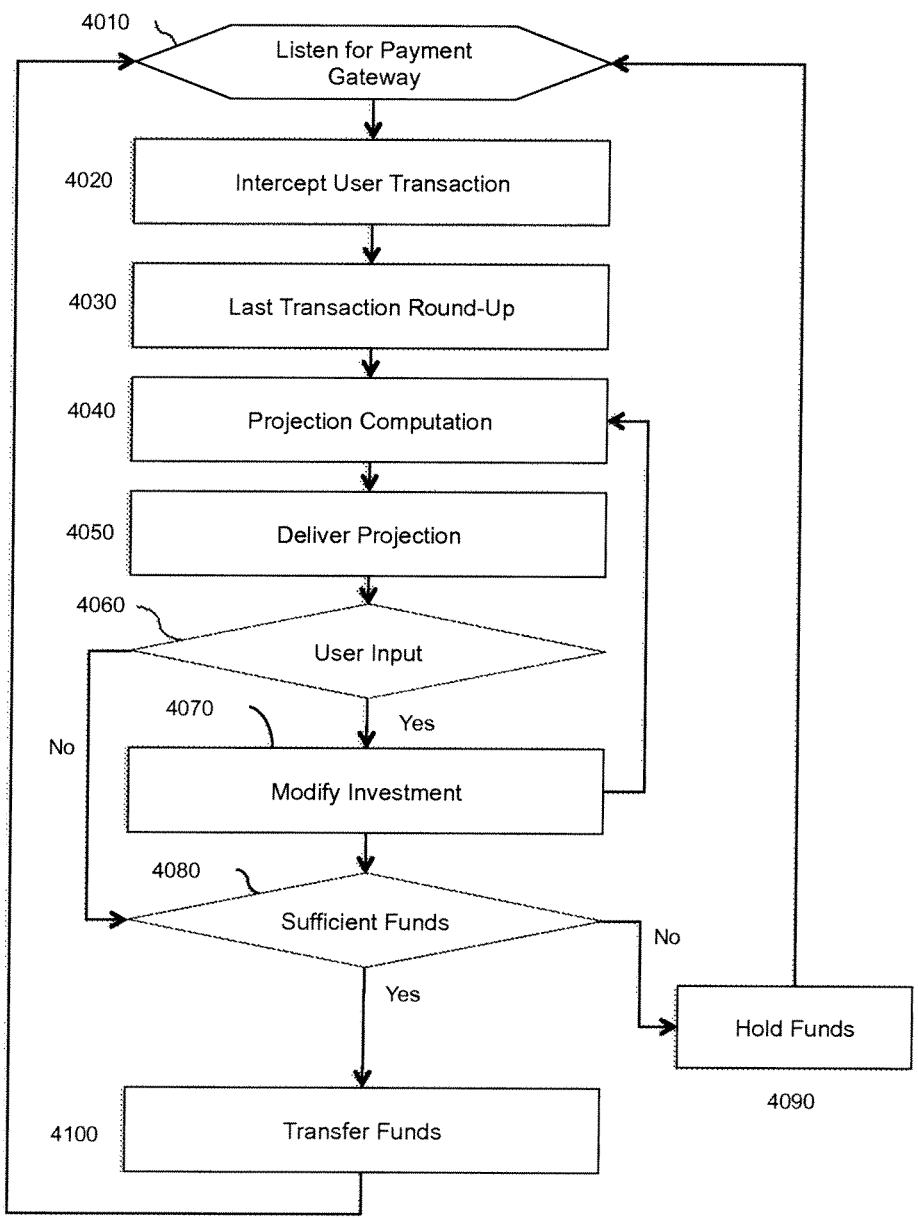

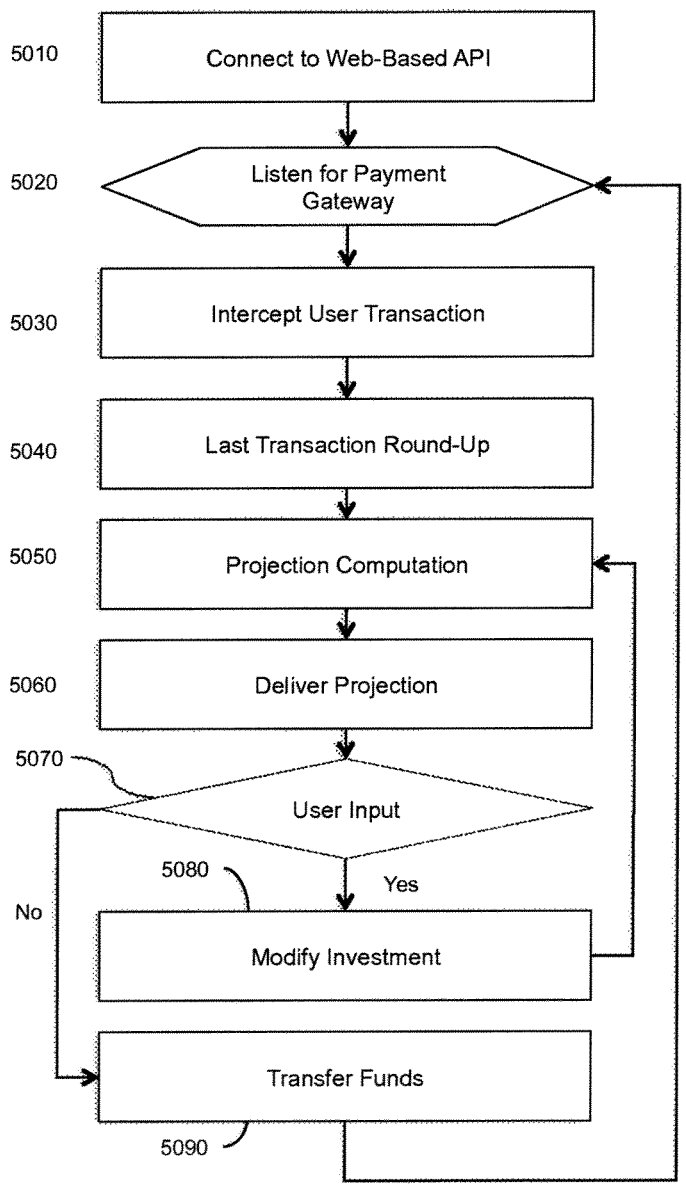

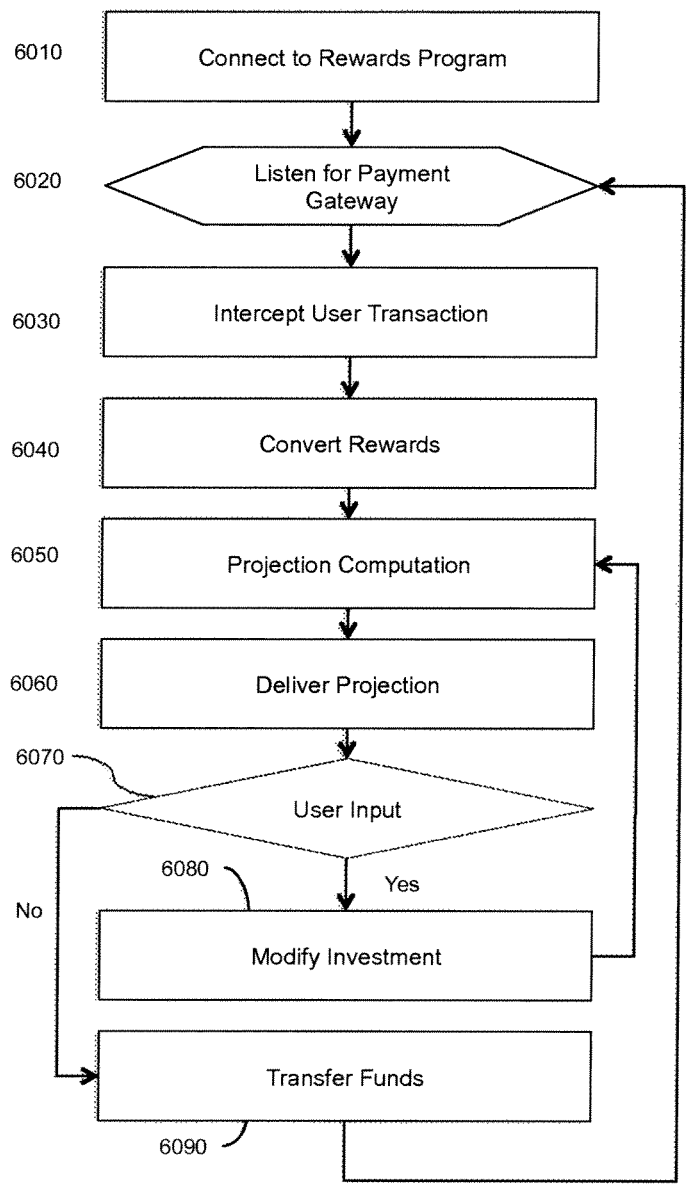

POINT OF SALE COMPUTER-IMPLEMENTED INVESTMENT MANAGEMENT TECHNOLOGY

CROSS-REFERENCE TO RELATED APPLICATIONS

The current application is a continuation of and claims priority under 35 U.S.C. § 120 to U.S. patent application Ser. No. 16/677,560 filed Nov. 7, 2019, which is a continuation of U.S. patent application Ser. No. 15/676,423 filed Aug. 14, 2017, which is a continuation of U.S. patent application Ser. No. 14/329,509 filed Jul. 11, 2014, which is a continuation of U.S. patent application Ser. No. 13/366,499 filed Feb. 6, 2012. The content of each of the above-noted patent applications is hereby incorporated by reference herein in its entirety.

FIELD

The disclosed subject matter generally relates to computer-implemented investment management technology, and more particularly to technical improvements to a point of sale computer-implemented investment management system.

BACKGROUND

A variety of traditional financial investment vehicles are available that help maximize and protect financial investments. Among these investment vehicles, long-term investment plans may be implemented to provide for future or retirement savings within an expected period of time. For example, a pension plan is an income arrangement that provides consumers deferred compensation following retirement. Pension plans typically are employment-based and may be classified as defined benefits, defined contributions, or a combination of both.

In addition, defined benefit plans may be implemented based on the promise of an employer for a specific payout at retirement based on the employee's salary and length of membership in the plan (e.g., Individual Retirement Accounts (IRAs) and 401(k) plans) where pre-defined investments are allocated from the employee's income. Similarly, with defined contribution plans, employers and/or employees contribute funds during employment. The payout at retirement is based on the performance of the investment and the amount of compensation is uncertain. Hybrid plan designs combine features of defined benefits as well as defined contributions (e.g., cash balance plans).

Current systems assume consumers possess adequate financial knowledge to realize the expected return from preserving assets. However, an inexperienced investor may not visualize an immediate benefit of saving. Techniques that allow a consumer to save excess funds rarely provides the consumer with potential investment benefits in real-time. Without immediate knowledge, the opportunity to save may not overcome a pre-conceived reluctance to defer consumer finance. Accordingly, an improved system and method for creating a nexus between savings/investments and consumer transactions through real-time investment projections is desirable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, a computer-implemented communications device in communication with a transaction gateway server is provided. During a point of sale transaction, a computation server intercepts a first transaction instantiated by the communications device for processing by the transaction server, the first transaction having a first numerical value. The computation server, instead of processing the first transaction, may process a second transaction, having a second numerical value greater than the first numerical value, and a third transaction, having a third numerical value, determined based on a numerical difference between the first numerical value and the second numerical value.

In some embodiments, the second transaction may result in a debit from a first account associated with at least one of the communications device or a user of the communications in an amount equal to at least the first numerical value. The third transaction may result in a deposit to a second account associated with at least one of the communications device or a user of the communications device in an amount equal to approximately the third numerical value for the purpose of making a financial investment in one or more funds. The third numerical value may be electronically displayed on a graphical user interface of the communications device.

In one aspect, during the point of sale transaction, an electronic payment gateway is created between the communications device and a point of sale terminal in electronic communication with the transaction gateway server. The third numerical value is electronically transferred to an index fund server for storage in a portfolio database. The amount to be transferred in the third transaction is aggregated with additional electronic funds. The amount to be transferred in the second transaction may be determined by rounding up the first numerical value to the next whole dollar value. An expected return from making the financial investment is published to a social media platform.

In some variations, the expected return reflects a historical performance of similar investments to the financial investment made according to Modern Portfolio Theory (MPT). The third numerical value is modifiable by way of user interaction with the communications device. The first numerical value represents a dollar amount associated with earned rewards points by at least one user of the communications device.

A method of creating investment projections based on a consumer transaction between a Point of Sales (POS) terminal, in electronic communication with a transaction gateway server, and a consumer communications device, configured to create an electronic payment gateway with the POS terminal, is provided. During a POS transaction, a computation server intercepts a first transaction instantiated by the communications device for processing by the transaction server, the first transaction having a first numerical value. The computation server, instead of processing the first transaction, may process a second transaction, having a second numerical value greater than the first numerical value.

In one embodiment, the computation server processes a third transaction, having a third numerical value, determined based on a numerical difference between the first numerical value and the second numerical value. The second transaction results in a debit from a first account associated with the communications device or a user of the communications in an amount equal to the first numerical value. The third transaction results in a deposit to a second account associated with the communications device or a user of the communications device in an amount equal to the third numerical value. The communications device electronically displays the third numerical value on a graphical user interface of the communications device. The second numerical value is determined from mathematically rounding the first numerical value. An expected return may be computed from investing the third transaction reflects the historical performance of similar investments designed according to Modern Portfolio Theory (MPT). The expected return may be published to a social media platform. In certain embodiments, user input modifies the third numerical value and the first numerical value represents a dollar amount of earned rewards points.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 4 is another flowchart of a process in accordance with one example implementation.

FIG. 5a is a flowchart of a process in accordance with one or more embodiments.

FIG. 6 is a flowchart of an example process in accordance with one or more aspects.

Figure 1:
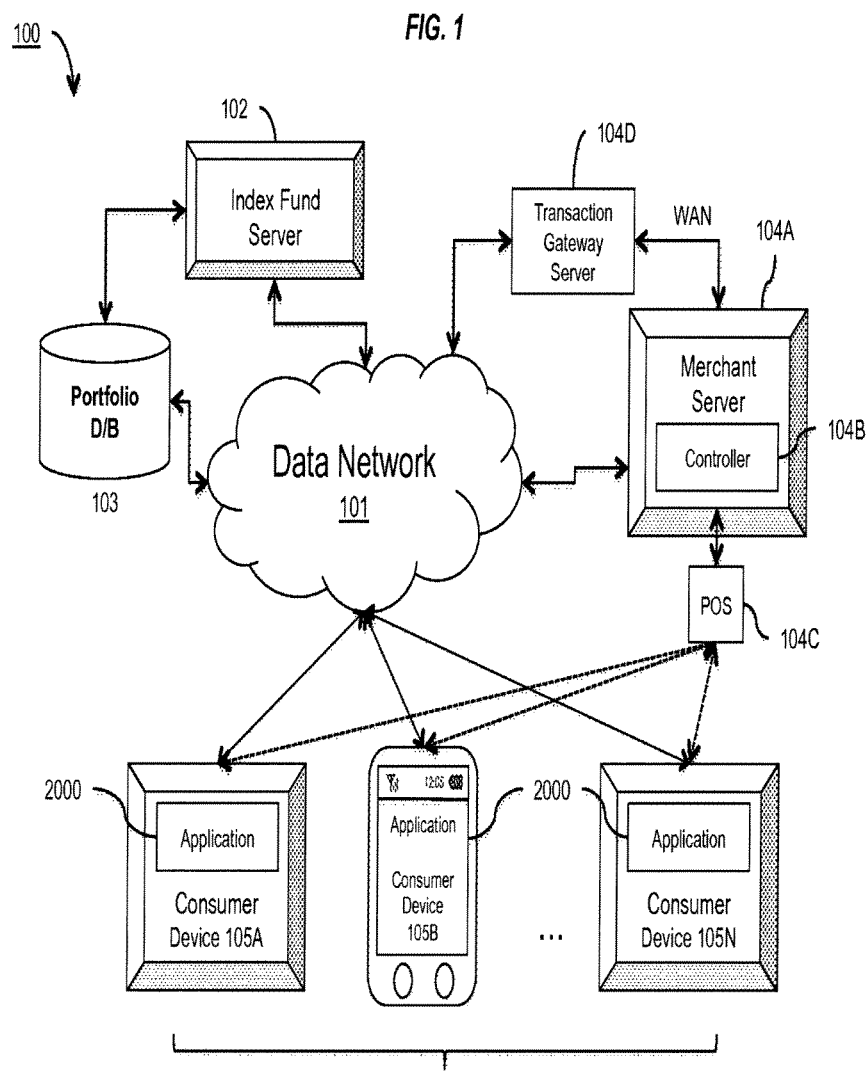
FIG. 1 is a schematic diagram of a network environment in accordance with one embodiment.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE EMBODIMENTS

When used correctly, investment vehicles not only promote economic growth but also personal financial safety. Investing resources provides fixed capital (e.g., land, buildings, equipment) for the economy and potential gain for the investor. The most effective long-term investments bear low risks and offer high profits. These investments minimize the effect of market fluctuations and other risks to maximize the expected return.

Methods for reducing investment risk include, but are not limited to, diversification and hedging. Investing in a variety of assets to diversify investments creates less risk than the weighted average risk of its constituent assets. Modern portfolio theory (MPT) mathematically formulates the concept of diversification in investing to reduce the total variance of a portfolio return. Alternatively, hedging involves investments in one market to offset and balance potential losses/risks incurred by assuming an opposing position. Methods for risk-averse investments are well understood and appreciated.

Unfortunately, despite the potential reward of investing and risk-aversion techniques, many traditionally available investment mechanisms do not utilized available technology or are based on technologies that fail to establish any long-term investment plan at all. In some cases, these investment programs are not always available to a large portion of the population. Even where available, many employees/consumers lack the motivation to invest over a long period of time because it is difficult to visualize a high-expected return without sufficient investment expertise. Accordingly, transactions costs (e.g., fees, commission, and so) are high and employees/consumers often are unwilling to accept the risk of investment for an unknown reward.

Related to investment programs, some employees/consumers choose savings to preserve their income. Savings are defined as income not spent (i.e., deferred consumption) such as, for example, money put aside in a bank. This also includes reducing expenses. Savings are relatively accessible to a larger group of users than most investments. A deposit account paying interest is often used to hold money for future needs. Typically, conventional saving methods earn low, fixed rates and present correspondingly lower risks than investments. It is possible to invest resources not spent as previously discussed; however, increased saving does not always correspond to increased investment. Nevertheless, consumers must still rely on self-discipline to save.

One method for encouraging financial asset protection influences users during the consumer transaction process. For example, in one implementation a consumer is allowed to save and/or donate a portion of a credit or debit transaction. Although this system is effective for creating opportunities to defer assets, the consumer still must actively choose to allocate the excess funds into a surplus account. Furthermore, current approaches only set aside the excess funds for future consumption (i.e., saved) rather than investing in hopes of realizing higher long-term returns. As discussed above, saving specifies a lower-risk preservation of money with a generally lower return than investments (e.g., a savings account offering a 3 percent interest rate may only grow at 1 percent annually based on a 2 percent inflation rate).

In return for a commitment to place an investment for a fixed period of time, long-term investments can offer a higher yield to encourage consumers to protect their assets. Compared to shorter-term savings or investments that may respond quickly to market fluctuations, investing a portion of savings over the long-term can return enough to outpace inflation. These lower rates are often insufficient to motivate an experienced consumer to actively allocate excess funds into a surplus account.

Effectively protecting consumer assets typically involves an appreciation of the risks/rewards associated with establishing investments. Turning to FIG. 1, an exemplary system 100 that pushes real-time investment data to a user during consumer transactions is further illustrated in block-diagram form. The system 100 includes a merchant server 104A communicatively linked—such as through a Wide Area Network (WAN)—to a transaction gateway server 104D. It should also be understood that merchant server 104A and transaction gateway server 104D could reside on the same computing device or on different computing devices. The merchant server 104A further includes a controller 104B monitoring point of sale (POS) input terminal 104C. POS terminal 104C is configured to support both contactless (e.g., radio) and direct (e.g., electrical conduction) transactions/data exchange including, for example, near field communication (NFC) device readers, credit/debit card readers, smart card readers, radio frequency identification (RFID) tag readers, and so on.

During a typical consumer transaction, merchants exchange goods or services for payment from a consumer. Online account-based systems—such as those available from PayPal and Google—allow consumers to securely transfer electronic payments from numerous financial accounts. In one embodiment, consumers 105 transmit electronic payment information using consumer devices 105A, 105B, and 105N, each having a processor and storage medium shown). Devices 105A, 105B, and 105N are preferably portable communications devices supporting NFC transmission. Examples include mobile phones, laptop computers, personal digital assistants (PDA), and portable multimedia players. However, devices 105A, 105B, and 105N also include laptops, desktops, multiprocessor systems, microprocessor-based systems, programmable consumer electronics, telephony systems, distributed computing environments, set top boxes, and so on. Devices 105A, 105B, and 105N may further include a user interface console, such as a touch screen monitor (not shown), to allow the user/consumer to preset various system parameters. User defined system parameters may include, but are not limited to, investment metrics, payment information, investment variables, and external application accessibility.

Consumers 105 touch, or bring into close proximity (e.g., usually a few centimeters), their consumer device to POS terminal 104C to make purchases. This triggers an NFC communication with an application in the consumer device through an NFC antenna, represented as dotted lines in FIG. 1. Controller 104B receives the input from the POS terminal 104B and transmits the payment information to transaction gateway server 104D, thereby creating an electronic payment gateway. As those of ordinary skill in the art would appreciate, payment gateways are application service providers to process and authorize the payment information.

In an alternative embodiment, payment information can be similarly transmitted over data network 101 through respective network connections, represented as solid lines in FIG. 1. These network connections are wired or wireless and are implemented using any known protocol. Similarly, data network 105 may be any one of a global data network (e.g., the Internet), a regional data network, or a local area network. The network 105 may use common high-level protocols, such as TCP/IP and may comprise multiple networks of differing protocols connected through appropriate gateways. Payment gateways are created upon transmission of payment information from consumer devices 105A, 105B, and 105N to merchant server 104A over data network 101, for example, via the Internet. System 100 further includes an Index Fund Server 102 controlling access to a portfolio database 103. Portfolio database 103 stores electronic files representing financial investment fund account information of consumers 105, including both individual and collective investment funds. In one embodiment, portfolio database 103 represents a collective investment scheme, such as storing various index funds.

As an example of a collective investment scheme, Index Funds Advisors (IFA) offer 100 Index Portfolios, which are individualized and indexed funds to replicate the movement of an index of a specific financial market. Alternatively, portfolio database 103 may represent other investment schemes, such as, social conscious funds, exchange-traded funds (ETF), mutual funds, fund of funds (FOF), pre-constructed portfolios, and so on. User input from consumers 105 may also specify a particular scheme for storage. The information from database 103 can be accessed over data network 101 through similar network connections discussed above. As one of ordinary skill in the art would appreciate, portfolio database 103 may be any type of storage device or storage medium such as hard disks, cloud storage, CD-ROMs, flash memory, DRAM and may also include a collection of devices (e.g., Redundant Array of Independent Disks ("RAID")). Similarly, it should be understood that Index Fund Server 102 and portfolio database 103 could reside on the same computing device or on different computing devices.

As previously mentioned, for consumer transaction systems 100 that allow consumers 105 to save and/or donate a portion of a credit or debit transaction, consumers 105 are given an option to submit a payment in excess of the amount required from merchant server 104A. Additional funds are then transferred to a surplus account. An immediate opportunity to set aside current funds is provided without actionable knowledge regarding the application of the excess funds. As a result, consumers 105 may not have an effective gauge of the potential earned value from investing excess funds. Therefore, the immediate opportunity to save during consumer transactions is often declined and can negatively affect retirement goals.

Figure 2:
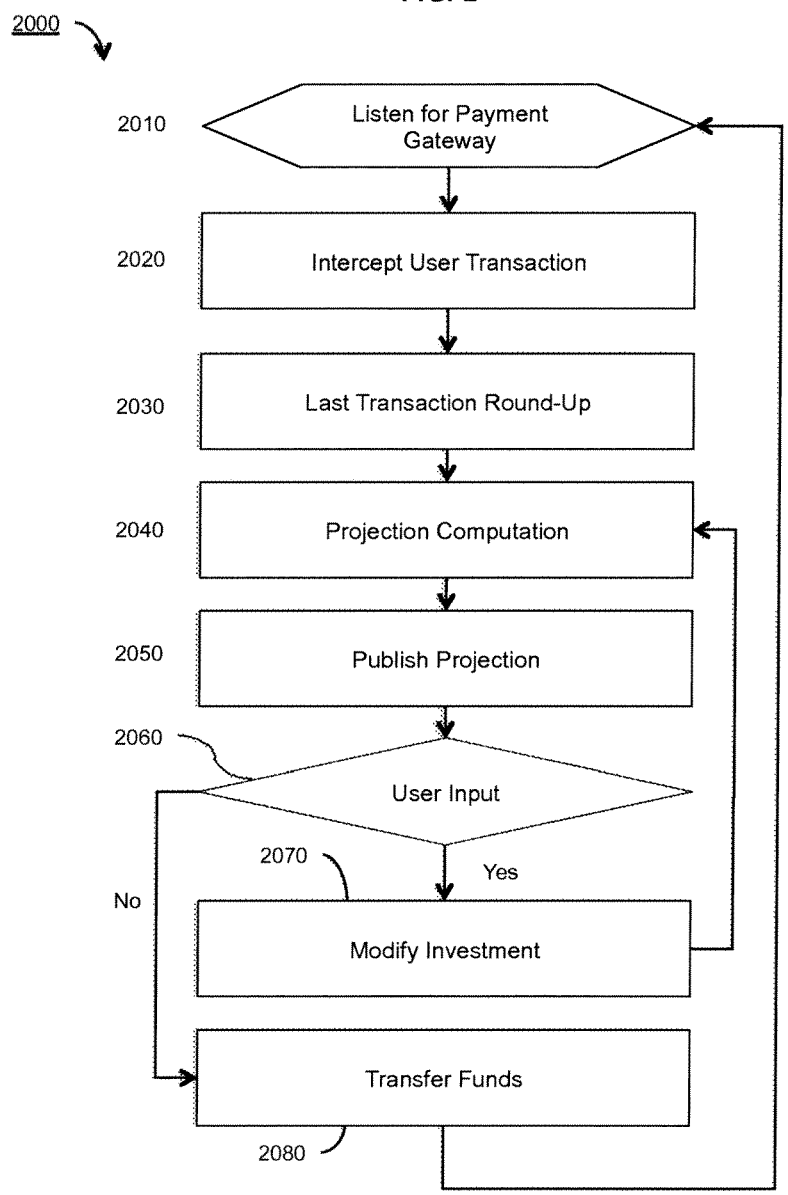
FIG. 2 is a flowchart of a process in accordance with certain embodiments.

One approach to address this issue is illustrated in FIG. 2, which illustrates a process 2000 that may be executed within consumer devices 105A, 105B, and 105N. Process 2000 may consist of various program modules including routines, programs, objects, components, data structures, and so on that perform particular tasks or implement particular abstract data types. In a distributed computing environment, these modules are located in both local and remote storage devices including memory storage devices.

When consumers 105 make a payment/transaction from their NFC-enabled device (e.g., 105A, 105B, and 105N), as described above, an electronic payment gateway facilitates the transfer of information between the consumer device 105A, 105B, and 105N and the merchant server 104A. Process 2000 monitors any transaction done through an approved gateway (starting block 2010) and intercepts the transmitted information (action block 2020). In one embodiment, consumers 105 authorize process 2000 to intercept payment information from consumer device 105A, 105B, and 105N in real-time, prior to transmission. However, process 2000 may also periodically poll transaction gateway server 104D for recent payment transactions. Client/server-based polling in network computing environments is well understood and appreciated.

Once the payment information is intercepted, process 2000 determines the amount of payment that is to be transferred from a consumer account using consumer device 105A, 105B, or 105N. This payment amount is then rounded-up to the next dollar amount (action block 2030). For example, a consumer purchase of $10.20 will be rounded-up to $11.00. Subsequently, the difference between the actual payment price and the rounded price (e.g., $0.80 using the previous example) is eligible for electronic transfer into an investment fund.

As illustrated in FIG. 2, prior to providing the consumer with an option to set aside this difference amount, action block 2040 immediately computes a projected return of a long-term investment of the difference amount (e.g., a 50-year investment). In one embodiment, this computation is based on the historical performance of portfolios designed according to Modern Portfolio Theory (MPT). For example, the predicted return may reflect the relative return of similar investments based on composite stock market indices of like companies/sectors (e.g., indices for companies of a certain size, management, and so on). However, mean reversion of the standard deviation on the rate of return of similar investments may also be used to measure the volatility of the investment. Consumers 105 may a so select related Return on Investment (ROI) metrics to compute a projected return.

Figure 3:
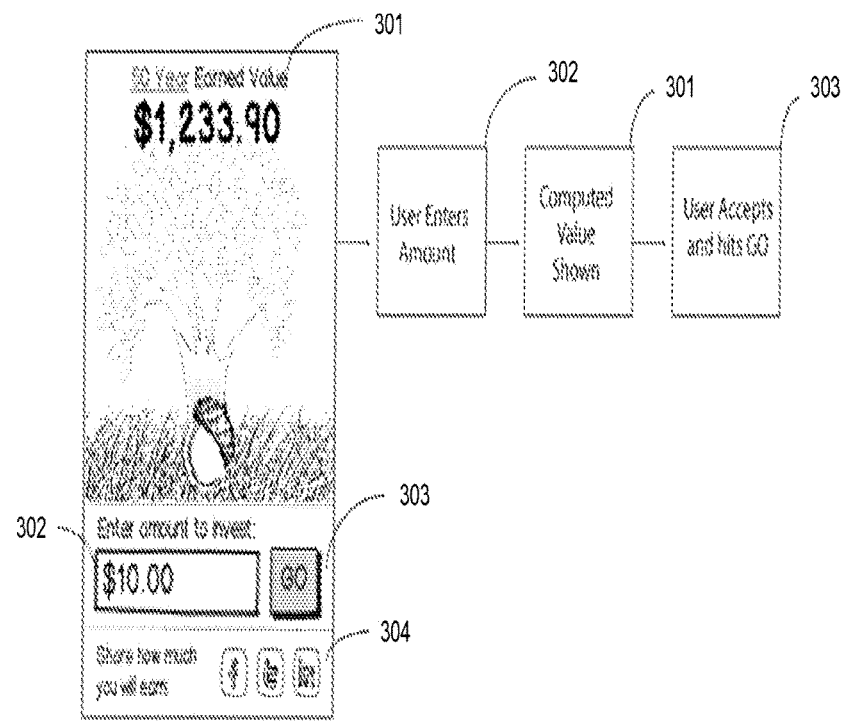
FIG. 3 is an example functional block diagram of a published computation delivered to a consumer device.

After a projected return is obtained, this information is immediately published to consumer device 105A, 105B, or 105N, e.g., using server push or comparable publish/subscribe-based data network communication (action block 2050). With reference to FIG. 3, a sample screenshot publication 300 is illustrated in block diagram form. The instant computed value obtained in action block 2040 is displayed as a possible earned value 301. In this example, earned value 301 is a projected value of the investment 302 (i.e., a 50-year investment of $10.00). Social networking options 304 allow consumers 105 to publish their earned value 301 on one or more social media platforms (e.g., Facebook®, Twitter®, LinkedIn®, etc.). Providing earned value 301 involves consumers 105 in the application of their possible savings. Through projected effects of investment, consumers 105 have an immediate gauge of personal savings goals to make speedy, and educated, decisions for allocating assets during a consumer transaction.

Turning back to FIG. 2, educated consumers 105 subsequently have the option to alter the amount to invest (decision block 2060). If a consumer customizes their investment to meet their specific financial goals (i.e., increase or decrease the difference between the transaction price and the rounded-up value), the investment value 302 is modified for transfer (action block 2070). As illustrated in FIG. 3, investment 302 is configured to receive consumer 105 input. Earned value 301 is dynamically updated to reflect the manual entry to investment 302 (return to action block 2040).

If the consumer 105 accepts by for example clicking submit box 303 in FIG. 3, the funds indicated in investment 302 are transferred to an index fund (action block 2080). Specifically, consumer device 105A, 105B, or 105N transfers payment information to Index Fund Server 10 over data network 101. The electronic funds are updated in the consumers respective account maintained in portfolio database 103. Accordingly, process 2000 provides the advantages of reducing transactions costs for investing a few cents a time and providing the expected future value of the investment, all during a payment/transaction from a consumer device. Process 2000 returns to action block 2010 to monitor and intercept the next consumer transaction.

Turning to FIG. 4, another process 4000 that pushes real-time investment data to a user during consumer transactions is further illustrated in block-diagram form. Like with process 2000, process 4000 monitors any transaction done through an approved gateway (starting block 4010) and intercepts the transmitted information (action block 4020). The amount of payment that is to be transferred from consumer device 105A, 105B, or 105N is rounded-up to the next dollar amount (action block 4030). The difference between the actual payment price and the rounded amount is eligible for electronic transfer into an investment fund. Prior to providing consumers with an option to set aside this amount, process 4000 immediately computes a projected return of a long-term investment of the difference amount (e.g., a 50-year investment) (action block 4040), as discussed in process 2000.

This projection is immediately delivered to consumer device 105A, 105B, or 105N, e.g., using server push or comparable publish/subscribe-based data network communication (action block 4050). With this information, consumers 105 have the option to alter the amount to invest (decision block 4060). If a consumer chooses to customize their investment (i.e., increase or decrease the difference between the transaction price and the rounded-up value), the investment value is modified for transfer (action block 4070), and process 4000 computes an updated investment projection to reflect the manual entry (return to action block 4040).

Once the consumer 105 approves the investment of their assets, process 4000 determines whether sufficient funds are present before an investment is made (decision block 4080). If sufficient funds are not present, process 4000 delays any transfer of funds and electronically stores the amount, such as within consumer devices 105A, 105B, or 105N, until an aggregate amount is sufficient for investment (action block 4090). By pooling together investors' funds, certain investments—for example, investments requiring a minimum dollar amount—for greater returns can be made. Aggregating funds to minimize the number of investment purchases also reduces transaction costs. Once a sufficient amount is present for transfer—including previously held funds, consumer device 105A, 105B, and 105N transfers a single bulk payment to Index Fund Server 102 for storage in database 103 over data network 101 (action block 4100). Process 4000 returns to action block 4010 to monitor and intercept the next consumer transaction over data network 101. Accordingly, process 4000 provides the advantage of further reducing transaction costs for greater returns.

Figure 5B:
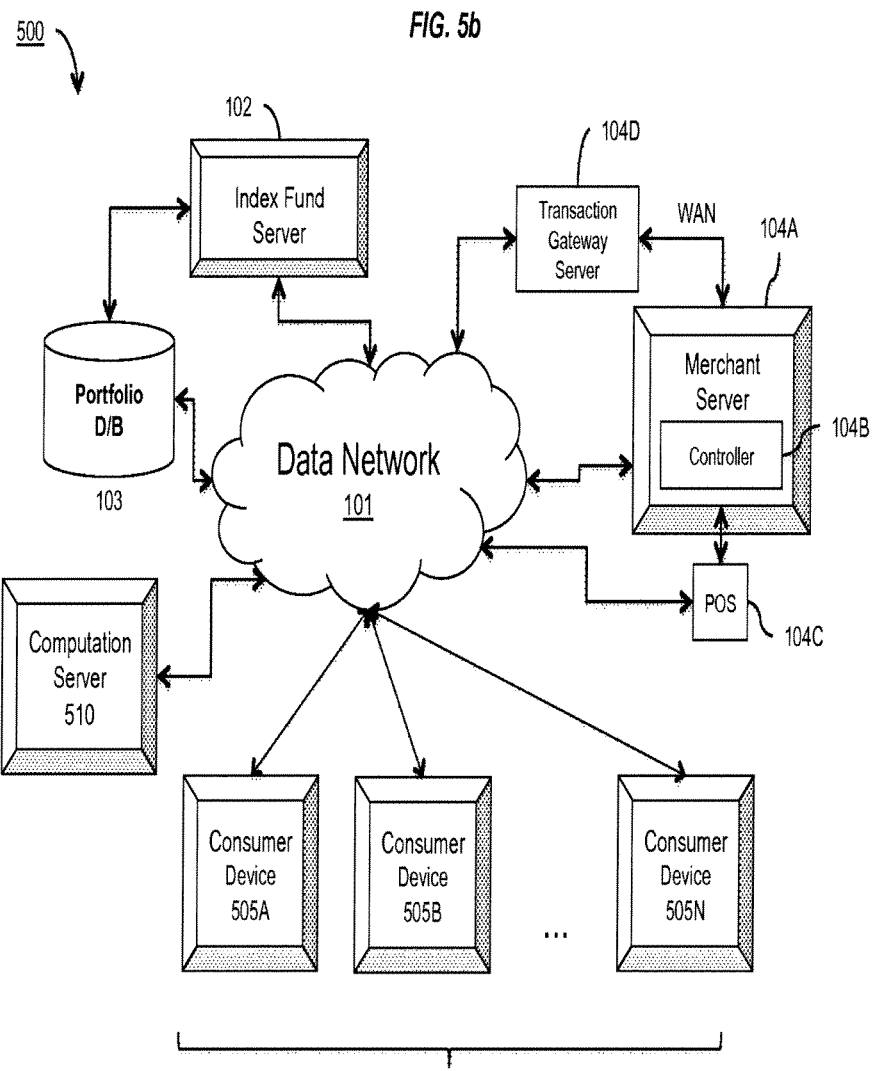
FIG. 5b is a schematic block diagram of a network environment executing a process in accordance with certain implementations.

Turning to FIG. 5a, another process 5000 that pushes real-time investment data to a user during consumer transactions is further illustrated in block-diagram form. This process is based on network system 500 having consumer devices 505 without NFC antennas, as shown in FIG. 5b. In system 500, a computation server 510 is connected to data network 101 through respective network connections as previously discussed. Computation server 510 preferably includes a web-based operating system and a processor (not shown) for hosting web pages and executing web-based applications, such as process 5000. Transaction gateway server 104D further includes an application program interface ("API") having a set of components, routines, protocols and tools for communicating with various applications (e.g., process 2000 and 5000). The API includes specifications for routines, data structures, object classes, and variables. Such interfaces are generally well known.

Turning back to FIG. 5a, computation server 510 monitors existing payment gateways (e.g., from online account-based systems discussed above) through the API of gateway server 104D (start block 5010). Once a connection is established, computation server 510 proceeds to monitor consumer transactions through payment gateways over data network 101, similar to process 2000 (delay block 5020). When consumers 505 make a payment/transaction from their consumer device (e.g., 505A, 505B, and 505N), computation server 510 intercepts the transmitted information, as described above (action block 5030). The amount of payment that is to be transferred over data network 101 is rounded-up to the next dollar amount (action block 5040), where the difference between the actual payment price and the rounded amount is eligible for electronic transfer into an investment fund. Prior to providing consumers with an option to set aside this amount, computation server 510 immediately computes a projected return of a long-term investment of the difference amount (e.g., a 50-year investment), as discussed in process 2000 (action block 5050).

This projection is immediately delivered to consumer device 505A, 505B, or 505N, e.g., using server push or comparable publish/subscribe-based data network communication, over data network 101 (action block 5060). With this information, consumers 505 have the option to alter the amount to invest (decision block 5070). If a consumer chooses to customize their investment (i.e., increase or decrease the difference between the transaction price and the rounded-up value), the investment value is modified for transfer (action block 5080), and computation server 510 computes an updated investment projection to reflect the manual entry (return to action block 5050). Once the consumer 505 approves the investment of their assets, consumer device 505A, 505B, or 505N transfers payment information to Index Fund Server 102 for storage in database 103 over data network 101 (action block 5090). However, similar to process 4000, payment information may also be delayed until sufficient funds are reached (not shown). Process 5000 returns to action block 5020 to monitor and intercept the next consumer transaction over data network 101.

In yet another alternative embodiment, FIG. 6 illustrates another process 6000 for converting consumer assets for future spending. The previous embodiments are based on consumer transactions using tangible funds (i.e., cash and electronic funds). However, other accounts and assets may be used. For example, rewards points allow companies to reward customers for various purchases. Points are awarded to a customer that can be accumulated and later redeemed for merchandise, cash, and/or services. During a consumer transaction, consumers redeem rewards points, instead of cash, for goods or services from merchants. Online account-based systems—such as those available from www.points.com or other major credit card companies—allow consumers to securely transfer reward points from numerous financial accounts just like cash. In one embodiment, consumers 505 transfer points, electronically, using consumer devices 505A, 505B, and 505N. While consumers 105 can similarly transfer reward points over data network 105 or through NFC in system 100, system 500 is used in this example for illustration purposes only. Accordingly, gateway server 104D is configured to receive and authorize reward-type payments.

Turning back to FIG. 6, like with process 5000, process 6000 monitors existing payment gateways (e.g., from online account-based systems discussed above) through the API of gateway server 104D (start block 6010). This allows consumers 505 to examine transactions from their rewards-based accounts. Once a connection is established, process 6000 proceeds to monitor consumer transactions through payment gateways over data network 101, similar to process 5000 (delay block 6020). When consumers 505 submit earned reward information from their consumer device (e.g., 505A, 505B, and 505N), process 6000 intercepts the transmitted information in real-time (action block 6030). The amount of rewards that is to be transferred over data network 101 is converted to the corresponding dollar amount and rounded-up, where the difference in rewards points between the actual payment price and the rounded amount is eligible for investment, as described above (action block 6040). Process 6000 immediately computes a projected return of a long-term investment if these reward points were converted to cash and invested (e.g., a 50-year investment), as discussed in process 2000 (action block 6050).

This projection is immediately delivered to consumer device 505A, 505B, or 505N, e.g., using server push or comparable publish/subscribe-based data network communication, over data network 101 (action block 6060). With this information, consumers 505 have the option to alter the amount of earned points to convert and invest (decision block 6070). If a consumer chooses to customize their investment, the number of points is modified for transfer (action block 6080 and process 6000 computes an updated investment projection to reflect the manual entry (return to action block 6050). Once the consumer 505 approves the conversion and investment of their rewards points, consumer device 505A, 505B, or 505N transfers the rewards information to Index Fund Server 102 for storage in database 103 over data network 101 (action block 6090). However, similar to process 4000, payment information may also be delayed until sufficient funds are reached (not shown). Process 6000 then returns to action block 6020 to monitor and intercept the next consumer transaction over data network 101.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network.

The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method comprising:
   intercepting, by a computer system, a consumer transaction initiated through an electronic payment gateway, the consumer transaction having a first numerical amount to be transferred from an account of a consumer to a payment recipient;
   determining, by the computer system, a second transaction amount that is different than the first numerical amount;
   determining, by the computer system, a third transaction amount, wherein the third transaction amount is the difference between the first and second transaction amount;
   determining an investment amount by aggregating the third transaction amount with at least a fourth transaction amount, wherein the fourth transaction amount is determined based on a second consumer transaction initiated by the consumer; and
   electronically communicating, to at least one computing device, the investment amount as an amount of funds to be deposited in an investment account of the consumer as a result of transactions initiated by the consumer that include at least the consumer transaction and the second consumer transaction.

2. The computer-implemented method of claim 1 further comprising causing display of the third transaction amount by a computing device of the consumer as an amount designated for investment on behalf of the consumer.

3. The computer-implemented method of claim 1, wherein the electronic payment gateway provides communication between a consumer communications device and a point of sale (POS) terminal in connection with the consumer transaction.

4. The computer-implemented method of claim 1, wherein the intercepting the consumer transaction is performed as a result of listening for transactions associated with the consumer via the electronic payment gateway.

5. The computer-implemented method of claim 1, wherein the second transaction amount is determined by rounding up the first numerical amount to a next whole dollar value.

6. The computer-implemented method of claim 1, wherein the computer system is located remotely from a point of sale (POS) terminal that initiated the consumer transaction via the electronic payment gateway.

7. The computer-implemented method of claim 1, wherein the consumer transaction is identified by the computing system based at least in part on a communication between a server of the electronic payment gateway and the computing system via an application programming interface (API) associated with the electronic payment gateway.

8. The computer-implemented method of claim 1, wherein the consumer transaction is intercepted as a result of the computer system periodically polling a server of the electronic payment gateway for one or more transactions of the consumer.

9. The computer-implemented method of claim 1, further comprising initiating transfer of funds of at least the investment transaction amount as a deposit to the investment account of the consumer.

10. A system comprising:
a hardware processor; and
a non-transitory computer-readable medium storing instructions that, when executed by the hardware processor, cause the hardware processor to perform operations comprising at least:
intercepting a consumer transaction initiated through an electronic payment gateway, the consumer transaction having a first numerical amount to be transferred from an account of a consumer to a payment recipient;
determining a second transaction amount that is different than the first numerical amount;
determining a third transaction amount, wherein the third transaction amount is the difference between the first and second transaction amount;
determining an investment amount by aggregating the third transaction amount with at least a fourth transaction amount, wherein the fourth transaction amount is determined based on a second consumer transaction initiated by the consumer; and
electronically communicating, to at least one computing device, the investment amount as an amount of funds to be deposited in an investment account of the consumer as a result of transactions initiated by the consumer that include at least the consumer transaction and the second consumer transaction.

11. The system of claim 10, wherein the operations further comprise causing display of the third transaction amount by a computing device of the consumer as an amount designated for investment on behalf of the consumer.

12. The system of claim 10, wherein the electronic payment gateway provides communication between a consumer communications device and a point of sale (POS) terminal in connection with the consumer transaction.

13. The system of claim 10, wherein the intercepting the consumer transaction is performed as a result of listening for transactions associated with the consumer via the electronic payment gateway.

14. The system of claim 10, wherein the second transaction amount is determined by rounding up the first numerical amount to a whole dollar value.

15. The system of claim 10, wherein the computer system is located remotely from a point of sale (POS) terminal that initiated the consumer transaction via the electronic payment gateway.

16. The system of claim 10, wherein the consumer transaction is identified by the system based at least in part on a communication between a server of the electronic payment gateway and the system via an application programming interface (API) associated with the electronic payment gateway.

17. The system of claim 10, wherein the consumer transaction is intercepted as a result of the system periodically polling a server of the electronic payment gateway for one or more transactions of the consumer.

18. The system of claim 10, wherein the operations further comprise initiating transfer of funds of at least the investment transaction amount as a deposit to the investment account of the consumer.

* * * * *